(12) United States Patent
Wagner et al.

(10) Patent No.: US 7,664,167 B2
(45) Date of Patent: *Feb. 16, 2010

(54) METHOD AND APPARATUS FOR MANAGING MODEM SAMPLE RATES ON A DIGITAL AUDIO INTERFACE WITHIN A DIRECT ACCESS ARRANGEMENT CIRCUIT

(75) Inventors: Robert C. Wagner, Austin, TX (US); Xun Yang, Austin, TX (US)

(73) Assignee: Silicon Laboratories, Austin, TX (US)

( * ) Notice: Subject to any disclaimer, the term of this patent is extended or adjusted under 35 U.S.C. 154(b) by 962 days.

This patent is subject to a terminal disclaimer.

(21) Appl. No.: 10/881,917

(22) Filed: Jun. 30, 2004

(65) Prior Publication Data
US 2006/0002456 A1    Jan. 5, 2006

(51) Int. Cl.
  *H04L 5/16* (2006.01)
(52) U.S. Cl. .................. 375/220; 375/222; 375/356; 375/355
(58) Field of Classification Search .......... 375/220, 375/222, 288, 355, 356
See application file for complete search history.

(56) References Cited

U.S. PATENT DOCUMENTS

| | | | |
|---|---|---|---|
| 6,256,723 B1 * | 7/2001 | Hudson et al. ............... | 712/35 |
| 6,269,103 B1 * | 7/2001 | Laturell ....................... | 370/458 |
| 6,404,780 B1 * | 6/2002 | Laturell et al. ............... | 370/510 |
| 6,502,138 B2 * | 12/2002 | Hindie et al. ................ | 709/231 |
| 6,606,689 B1 * | 8/2003 | Cheng et al. ................. | 711/137 |
| 6,642,876 B2 * | 11/2003 | Subramoniam et al. ..... | 341/144 |
| 6,735,246 B1 * | 5/2004 | Dupuis et al. ................ | 375/222 |
| 6,891,935 B1 * | 5/2005 | Bresemann et al. ....... | 379/93.05 |
| 2002/0126806 A1 * | 9/2002 | Rahamim et al. ......... | 379/93.05 |
| 2005/0278168 A1 * | 12/2005 | Liu et al. ..................... | 704/221 |

* cited by examiner

*Primary Examiner*—Shuwang Liu
*Assistant Examiner*—Kabir A Timory
(74) *Attorney, Agent, or Firm*—Antony P. Ng; Dillon & Yudell LLP

(57) ABSTRACT

An apparatus for managing modem sample rates within a direct access arrangement (DAA) circuit is disclosed. The DAA circuit includes a serial audio interface for providing communications between the DAA circuit and a host computer system. The serial audio interface is capable of operating under multiple serial communication interface standards, such as the AC '97 standard and the HD Audio standard. The DAA circuit also includes means for configuring the serial audio interface to transmit and receive modem samples at an audio sample rate higher than a modem sample rate of modem samples and at a predetermined bit size that is wider than a bit size of the modem samples, such that one bit of each of the modem samples is utilized to indicate the validity of each associated modem samples.

10 Claims, 3 Drawing Sheets

METHOD AND APPARATUS FOR MANAGING MODEM SAMPLE RATES ON A DIGITAL AUDIO INTERFACE WITHIN A DIRECT ACCESS ARRANGEMENT CIRCUIT

BACKGROUND OF THE INVENTION

1. Technical Field

The present invention relates to data communications in general, and in particular to data communications utilizing direct access arrangement circuits. Still more particularly, the present invention relates to an apparatus for managing modem sample rates on a digital audio interface within a direct access arrangement circuit.

2. Description of Related Art

A direct access arrangement (DAA) circuit is commonly utilized to connect an electrical system to a telephone network. A DAA circuit can provide a communication channel between a host computer system and a tip-and-ring telephone line.

Generally speaking, a DAA circuit includes a system-side circuit and a line-side circuit. The system-side circuit communicates with a host computer system via a communication interface. The communication interface may provide data and control information between the host computer system and the DAA circuitry. In order to allow data communications across a tip-and-ring telephone line, the host computer system may include dedicated modem hardware to provide the necessary modem data processing. Alternatively, a "soft" modem can be implemented within the host computer system by utilizing hardware resources within the host computer system in conjunction with modem software that is being executed on the host computer system.

Regardless of the type of modem being implemented, the DAA circuit must be configured in a manner such that it is compatible with the serial communication interface standard utilized by the host computer system in order for the DAA to take advantage of the serial communication interface of the host computer system. Current serial communication interface standards include the Audio Codec '97 (AC '97) standard and the HD Audio standard.

The AC '97 standard, which is sponsored by the Intel Corporation, provides a uniform interface for computer system audio applications. The current AC '97 standard is enumerated under the AC '97 Component Specification, revision 2.1 (May 22, 1998). The AC-97 Component Specification provides the details for a controller residing in a computer system to communicate with a variety of telecommunication devices, the pertinent of which is incorporated by reference herein. Some of those telecommunication devices, such as modems, are capable of using tip-and-ring telephone lines to communicate with other devices external to the computer system.

The HD Audio standard, which is also sponsored by the Intel Corporation, is an upgrade of the AC '97 standard. The current HD Audio standard is enumerated under the HD Audio Specification, revision 1.0 (2004), the pertinent of which is incorporated by reference herein. Similar to the AC-97 specification, the HD Audio Specification maintains a five-wire audio interface. However, the HD audio interface is based upon a packet-based protocol rather than a time-division multiplex-based protocol.

The present disclosure provides a method and apparatus for managing modem sample rate on a serial communication interface within a DAA circuit that is capable of accommodating both the AC '97 standard and the HD Audio standard.

SUMMARY OF THE INVENTION

In accordance with a preferred embodiment of the present invention, a direct access arrangement (DAA) circuit is capable of coupling a host computer system to a telephone line while providing isolation between the host computer system and the telephone line. The DAA circuit includes a serial audio interface for providing communications between the DAA circuit and the host computer system. The serial audio interface can operate under multiple serial communication interface standards, such as the AC '97 standard and the HD Audio standard. The DAA circuit also includes means for configuring the serial audio interface to transmit and receive modem samples at an audio sample rate higher than a modem sample rate of modem samples and at a predetermined bit size that is wider than a bit size of the modem samples, such that one bit of each of the modem samples is utilized to indicate the validity of each associated modem samples.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
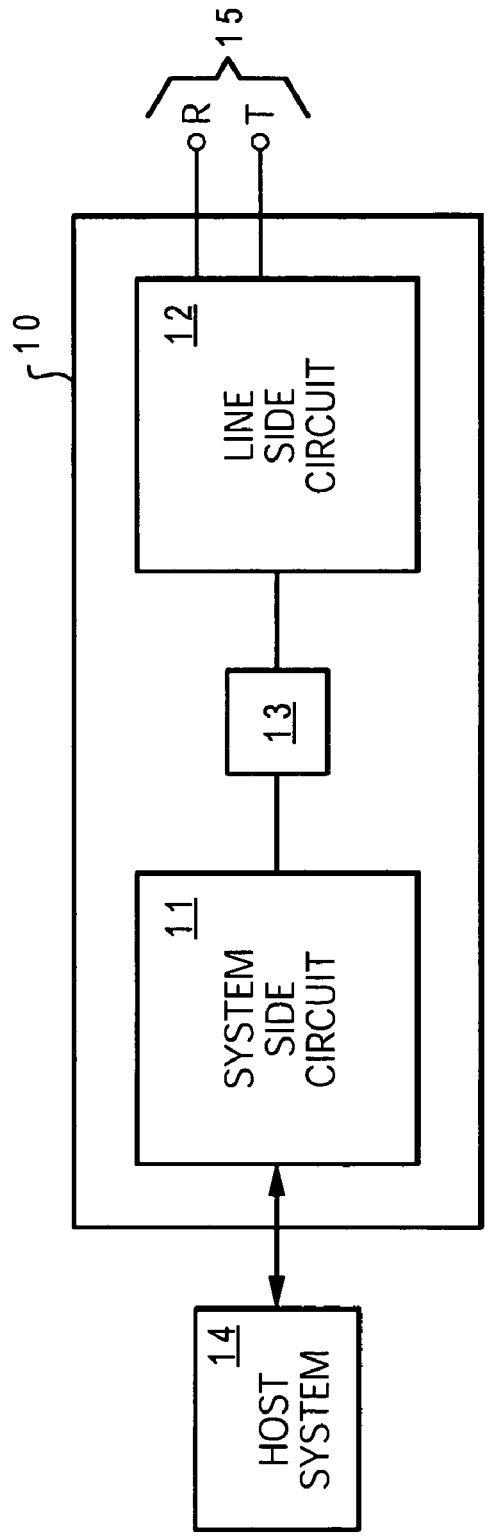
FIG. 1 is a block diagram of a direct access arrangement (DAA) circuit, in accordance with a preferred embodiment of the present invention.

Referring now to the drawings and in particular to FIG. 1, there is depicted a block diagram of a direct access arrangement (DAA) circuit, in accordance with a preferred embodiment of the present invention. As shown, a DAA circuit 10 includes a system-side circuit 11 and a line-side circuit 12. DAA circuit 10 also includes an isolation barrier 13 to provide electrical isolation as required by various domestic and foreign governmental standards to isolate a telephone line network from an electrically powered circuitry. System-side circuit 11 includes integrated circuits and/or discrete devices that are located on the system side of an isolation barrier 13. Line-side circuit 12 includes integrated circuits and/or discrete devices that are located on the telephone line side of isolation barrier 13. DAA circuit 10 provides a communication channel from a host computer system 14 to tip-and-ring telephone lines 15. Host computer system 14 can be any of a wide range of electrical systems including, but not limited to, a personal computer, a point-of-sale device, a set-top box, etc.

System-side circuit 11 communicates with host computer system 14 through a communication interface (not shown).

The communication interface may provide data and control information between host computer system 14 and DAA circuit 10. Host computer system 14 may include dedicated modem hardware to provide the necessary modem data processing to allow data communications across tip-and-ring telephone lines 15. Alternatively, host computer system 14 may implement a "soft" modem by utilizing system hardware resources in conjunction with modem software that is being executed within host computer system 14.

Figure 2:
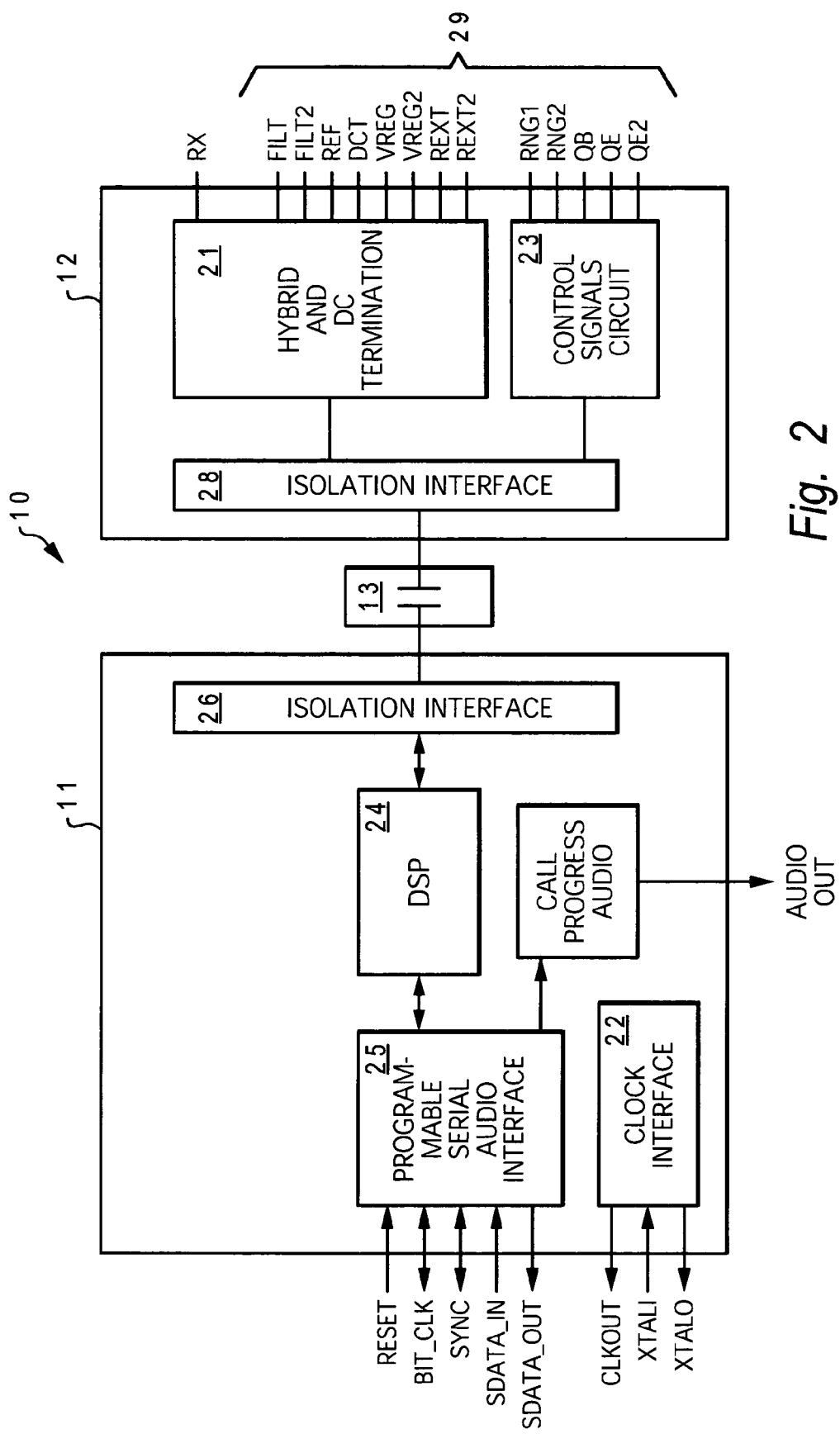
FIG. 2 is a detailed block diagram of the DAA from FIG. 1, in accordance with a preferred embodiment of the present invention.

With reference now to FIG. 2, there is depicted a detailed block diagram of DAA 10, in accordance with a preferred embodiment of the present invention. As shown, a system-side circuit 11 includes a clock interface 22, a digital signal processor 24, a programmable serial audio interface 25 and an isolation interface 26. Line-side circuit 12 includes a hybrid and DC termination circuit 21, a control signal circuit 23 and an isolation interface 28. Control signal circuit 23 may include a ring detect circuit, an off-hook detect circuit, etc. A group of signal lines 29 may couple line-side circuit 12 to discrete components that are used to connect line-side circuit 12 to the tip-and-ring telephone lines of a conventional telephone network. An isolation barrier 13 is connected between system-side circuit 11 and line-side circuit 12. Isolation barrier 13 can be capacitors, transformers, opto-couplers, etc.

System-side circuit 11 may communicate with a main bus of a host computer system through programmable serial audio interface 25. Programmable serial audio interface 25 may be configured for any of a wide variety of communication interface standards, such as the above-mentioned AC '97 standard and the HD Audio standard. Programmable serial audio interface 25 is configured as a multi-line bus connection. Information provided across programmable serial audio interface 25 may be input data, output data, clocking information, synchronization information, reset triggers, etc. In addition to communication with the main bus of the host computer system through programmable serial audio interface 25, system-side circuit 11 also receives a master clock from the host computer system. Although not shown, system-side circuit 11 may also communicate with the host computer system through other circuit modules that provide functionality such as device identification, general purpose input/output, etc.

Figure 3:
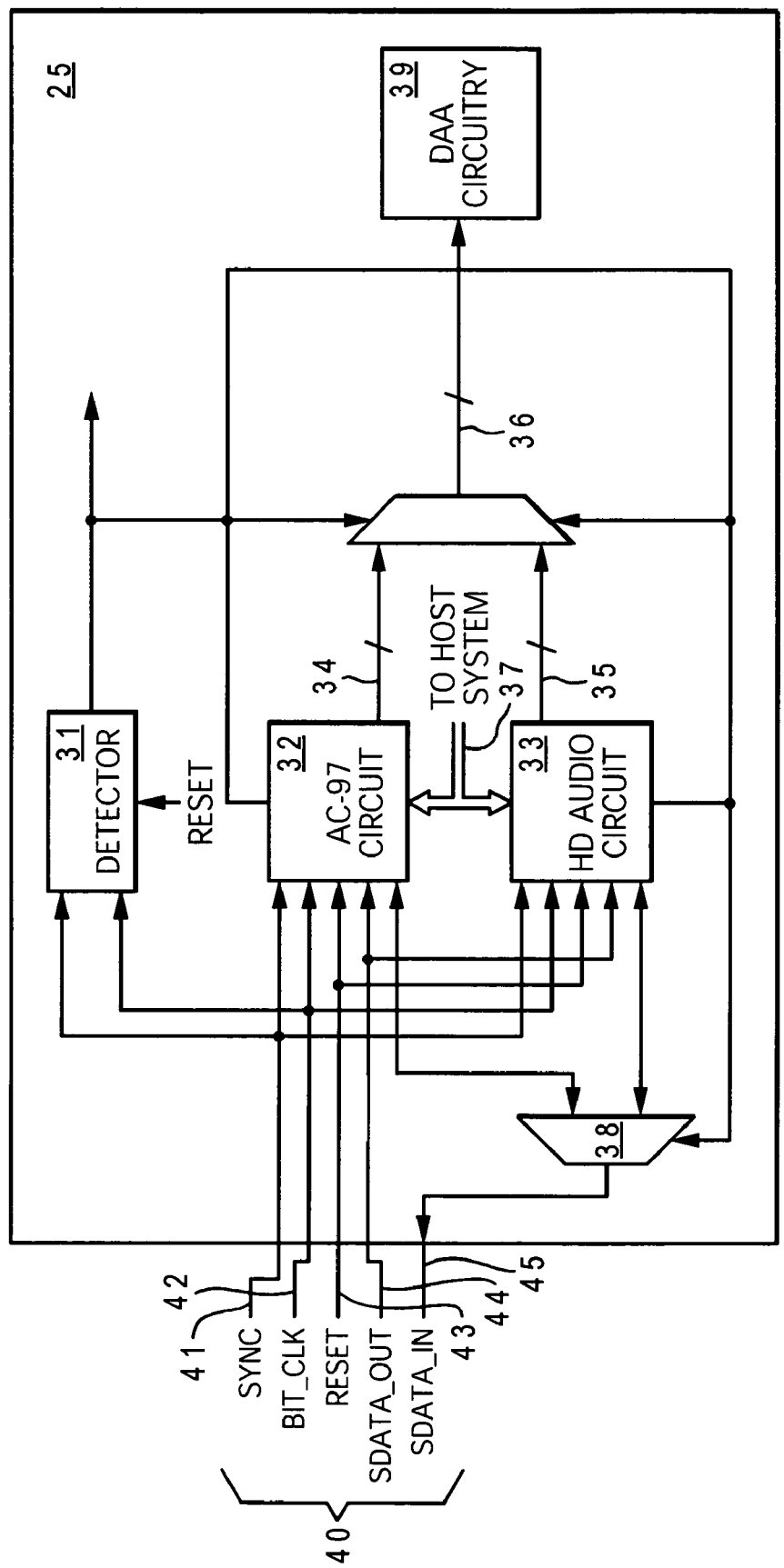
FIG. 3 is a detailed block diagram of a programmable serial audio interface within the DAA from FIG. 1, in accordance with a preferred embodiment of the present invention.

Referring now to FIG. 3, there is depicted a detail block diagram of programmable serial audio interface 25, in accordance with a preferred embodiment of the present invention. As shown, programmable serial audio interface 25 includes a detector 31, an AC-97 circuit 32, an HD Audio circuit 33 and other DAA circuitry 39. Multiple communication interface lines 40, which includes a SYNC line 41, a BIT_CLK line 42, a RESET line 43, a SDATA_OUT line 44 and a SDATA_IN line 45, are provided to programmable serial audio interface 25. More particularly, communication interface lines 40 are provided to AC-97 circuit 32 and HD Audio circuit 33 within programmable serial audio interface 25.

SYNC line 41 is for transmitting a data framing signal that is used to identify data communication frames. BIT_CLK line 42 is for transmitting control data on SDATA_IN line 45 and latch data on SDATA_OUT line 44. RESET line 43 is for transmitting a hardware reset signal. SDATA_OUT line 44 provides data from a host computer system to DAA circuit 10, and SDATA_IN line 45 provides data from DAA circuit 10 to the host computer system. Detector 31 counts the number of pulses of BIT_CLK signal on BIT_CLK line 42 during an assertion of SYNC line 41 to determine if host computer system 14 (from FIG. 1) is an AC-97 based system or an HD Audio based system.

AC-97 circuit 32 may include a serial-to-parallel converter circuit to change the serial information contained on SDATA_OUT line 44 to parallel information that are more suitable to a parallel bus 34. Thus, AC-97 circuit 32 may extract the AC 97 field, data, and control information and, in turn, presents such information on parallel bus 34. Likewise, HD Audio circuit 33 may include a serial-to-parallel converter circuit to change the serial information contained on SDATA_OUT line 44 to parallel information that are more suitable to a parallel bus 35. HD Audio circuit 33 may extract the serial HD Audio based information and, in turn, presents such information on parallel bus 35. Information that is being provided from host computer system 14 (from FIG. 1) through programmable serial audio interface 25 to the rest of DAA circuit 10 is provided on a bus 36.

AC-97 circuit 32 and HD Audio circuit 33 may also receive information that is to be communicated from DAA circuit 10 to host computer system 14. Such information are provided on a bus 37 and is converted to the appropriate serial format by either AC-97 circuit 32 or HD Audio circuit 33 that provide the serial data through a multiplexer 38 to SDATA_IN line 45.

A serial audio interface within a host computer system, such as host computer system 14, is originally designed for processing audio samples according to industry-defined audio standards such as the AC '97 or the HD Audio standard. Thus, the serial audio interface typically cannot be used to process modem samples, especially when the sample rates of modem samples are generally much smaller than the sample rates of audio samples. For example, common sample rates for modem samples typically include 7,200 Hz, 8,000 Hz, 8228.57 (57,600/7) Hz, 8,400 Hz, 9,000 Hz, 9,600 Hz and 10,285.71 Hz. In contrast, common sample rates for audio samples typically include 44.1 kHz and 22.05 kHz. Thus, most, if not all, of the sample rates for audio samples do not match up with the sample rates for modem samples. In addition, the standard sample size for modem samples is different from the standard sample size for audio samples. For example, the standard sample size for modem samples is 16 bits, and the standard sample size for audio samples can be either 16 or 24 bits. Hence, certain modifications to programmable serial audio interface 25 are necessary in order for programmable serial audio interface 25 to communicate with a serial audio interface within a host computer system for the purpose of processing modem samples.

Figure 4:
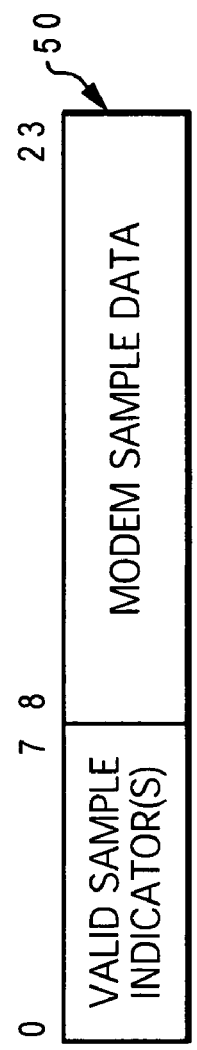
FIG. 4 is a graphical illustration of a modem sample format accepted by the programmable serial audio interface from FIG. 3, in accordance with a preferred embodiment of the present invention.

In accordance with a preferred embodiment of the present invention, programmable serial audio interface 25 is configured for a sample width of 24 bits, with the 16 least significant bits (LSBs) utilized to handle modem sample data, and one of the 8 most significant bits (MSBs) utilized to indicate the validity of the modem sample data. With reference now to FIG. 4, there is a graphical illustration of a modem sample format accepted by programmable serial audio interface 25, in accordance with a preferred embodiment of the present invention. As shown, a modem sample 50 is 24-bit long. The sixteen LSBs of modem sample 50 is for carrying modem sample data. Any one or more of the eight MSBs of modem sample 50 is for indicating the validity of the modem sample data. For example, any one of the eight MSBs can be set to a logical "1" to indicate the transmitted modem sample is valid, and either the same or a different one of the eight MSBs can be set to a logical "0" to indicate the transmitted modem sample is invalid.

In addition, when transmitting and receiving modem samples, programmable serial audio interface 25 is set to a sample rate that is at least as high as the actual modem sample rate. Basically, the sample rate of programmable serial audio interface 25 can be equal to or higher than but not lower than the actual modem sample rate when transmitting and receiving modem samples. Decimation is required to discard some modem samples when the sample rate of programmable serial audio interface 25 is set to be higher than the actual modem sample rate. However, no interpolation is allowed to add modem samples when the sample rate of programmable serial audio interface 25 is set to be lower than the actual modem sample rate.

Several examples of modem sample rate management based on the above-mentioned typical modem sample rates are depicted in Table I.

TABLE I

| modem sample rate (Hz) | audio interface sample rate (Hz) | sample pattern |
|---|---|---|
| 7200 | 9600 | xxx-xxx-xxx- . . . |
| 8000 | 8000 | xxxxxxxx . . . |
| 8228.57 | 9600 | xxxxxx-xxxxxx- . . . |
| 8400 | 9600 | xxxxxxx-xxxxxxx- . . . |
| 9000 | 12000 | xxx-xxx-xxx- . . . |
| 9600 | 9600 | xxxxxxxx . . . |
| 10285.71 | 24000 | xxx----xxx----xxx--- . . . |

In Table I, "x" represents a valid modem sample packet and "-" represents an invalid modem sample packet. In row 1, the sample rate of programmable serial audio interface 25 is set to 9,600 Hz to handle the modem sample rate of 7,200 Hz, and the modem sample pattern is three valid sample packets followed by one invalid sample packet. In row 2, the sample rate of programmable serial audio interface 25 is set to 8,000 Hz to handle the modem sample rate of 8,000 Hz. Because the sample rate of programmable serial audio interface 25 matches with the modem sample rate, there is no invalid modem sample packet. In row 3, the sample rate of programmable serial audio interface 25 is set to 9,600 Hz to handle the modem sample rate of 8,228.57 Hz, and the modem sample pattern is six valid sample packets followed by one invalid sample packet. In row 4, the sample rate of programmable serial audio interface 25 is set to 9,600 Hz to handle the modem sample rate of 8,400 Hz, and the modem sample pattern is seven valid sample packets followed by one invalid sample packet.

In row 5, the sample rate of programmable serial audio interface 25 is set to 12,000 Hz to handle the modem sample rate of 9,600 Hz, and the modem sample pattern resembles those in row 1. In row 6, the sample rate of programmable serial audio interface 25 is set to 9,600 Hz to handle the modem sample rate of 9,600 Hz, and the modem sample pattern resembles those in row 2. In row 6, the sample rate of programmable serial audio interface 25 is set to 24,000 Hz to handle the modem sample rate of 10,285.71 Hz, and the modem sample pattern is three valid sample packets followed by four invalid sample packets.

As has been described, the present invention provides an apparatus for managing modem sample rates on a digital audio interface within a DAA circuit.

While the invention has been particularly shown and described with reference to a preferred embodiment, it will be understood by those skilled in the art that various changes in form and detail may be made therein without departing from the spirit and scope of the invention.

What is claimed is:

1. A method for configuring a direct access arrangement (DAA) circuit, wherein said DAA circuit is capable of coupling a host computer system to a telephone line while providing isolation between said host computer system and said telephone line, said method comprising:

providing a serial audio interface within said DAA circuit, wherein said serial audio interface allows for communications between said DAA circuit and said host computer system, wherein said serial audio interface is capable of operating under a plurality of serial communication interface standards; and configuring said serial audio interface to transmit and receive modem samples at an audio sample rate higher than a modem sample rate of said modem samples and at a predetermined bit size that is wider than a bit size of said modem samples, wherein said predetermined bit size is 24 bits with M least significant bits of said 24 bits being utilized to store said modem sample data, and one of N most significant bits utilized to indicate validity of said modem sample data by setting said one of N most significant bits of said 24 bits to a first logical state to indicate said modem sample data is valid, and by setting said one of N most significant bits of said 24 bits to a second logical state to indicate said modem sample data is invalid, wherein M and N are integers greater than one with M being greater than N.

2. The method of claim 1, wherein one of said plurality of serial communication interface standards is the AC '97 standard.

3. The method of claim 2, wherein one of said plurality of serial communication interface standards is the HD Audio standard.

4. The method of claim 1, wherein said predetermined bit size is 24.

5. The method of claim 1, wherein method further includes configuring said serial audio interface to transmit and receive modem samples at an audio sample rate higher than a modem sample rate of said modem samples.

6. A direct access arrangement (DAA) circuit capable of coupling a host computer system to a telephone line while providing isolation between said host computer system and said telephone line, said DAA circuit comprising:

a serial audio interface for providing communications between said DAA circuit and said host computer system, wherein said serial audio interface is capable of operating under a plurality of serial communication interface standards; and means for configuring said serial audio interface to transmit and receive modem samples at an audio sample rate higher than a modem sample rate of said modem samples and at a predetermined bit size that is wider than a bit size of said modem samples, wherein said predetermined bit size is 24 bits with M least significant bits of said 24 bits being utilized to store said modem sample data, and one of N most significant bits of said 24 bits being utilized to indicate validity of said modem sample data by setting said one of N most significant bits of said 24 bits to a first logical state to indicate said modem sample data is valid, and by setting said one of N most significant bits of said 24 bits to a second logical state to indicate said modem sample data is invalid, wherein M and N are integers greater than one with M being greater than N.

7. The DAA circuit of claim 6, wherein one of said plurality of serial communication interface standards is the AC '97 standard.

8. The DAA circuit of claim 7, wherein one of said plurality of serial communication interface standards is the HD Audio standard.

9. The DAA circuit of claim 6, wherein said predetermined bit size is 24.

10. The DAA circuit of claim 6, wherein DAA circuit further includes means for configuring said serial audio interface to transmit and receive modem samples at an audio sample rate higher than a modem sample rate of said modem samples.

* * * * *